United States Patent [19]

Webb et al.

[11] Patent Number: 5,727,135

[45] Date of Patent: Mar. 10, 1998

[54] MULTIPLE PRINTER STATUS INFORMATION INDICATION

[75] Inventors: James Francis Webb; Jeffrey Keith Wedinger; John Neil Wellman, all of Lexington, Ky.

[73] Assignee: Lexmark International, Inc., Lexington, Ky.

[21] Appl. No.: 691,631

[22] Filed: Aug. 2, 1996

Related U.S. Application Data

[63] Continuation of Ser. No. 409,563, Mar. 23, 1995, abandoned.

[51] Int. Cl.⁶ .................................................. G06K 15/00
[52] U.S. Cl. .......................................... 395/113; 395/114
[58] Field of Search .................... 395/113, 112, 395/114, 101, 970, 965, 966, 185.1, 184.01, 185.01, 183.22, 339, 329; 355/203, 204, 205, 206, 207; 358/406, 437, 404, 407; 347/19; 370/449; 345/117

[56] References Cited

U.S. PATENT DOCUMENTS

| | | | |
|---|---|---|---|
| 5,075,875 | 12/1991 | Love et al. | 395/117 |
| 5,084,875 | 1/1992 | Weinberger et al. | 355/205 |
| 5,164,842 | 11/1992 | Gauronski et al. | 358/401 |
| 5,214,772 | 5/1993 | Weinberger et al. | 395/575 |
| 5,220,566 | 6/1993 | Ikenoue | 370/112 |
| 5,220,674 | 6/1993 | Morgan et al. | 395/800 |
| 5,226,112 | 7/1993 | Mensing et al. | 395/114 |
| 5,247,623 | 9/1993 | Sun | 395/325 |
| 5,271,065 | 12/1993 | Rourke et al. | 382/1 |
| 5,303,336 | 4/1994 | Kageyama et al. | 395/114 |
| 5,323,393 | 6/1994 | Barrett et al. | 370/85.8 |
| 5,333,286 | 7/1994 | Weinberger et al. | 355/204 |
| 5,353,388 | 10/1994 | Motoyama | 395/117 |
| 5,361,265 | 11/1994 | Weinberger et al. | 355/205 |
| 5,371,837 | 12/1994 | Kimber et al. | 395/114 |
| 5,438,528 | 8/1995 | Emerson et al. | 364/580 |

FOREIGN PATENT DOCUMENTS

| | | | |
|---|---|---|---|
| 0 575 168 A1 | 12/1993 | European Pat. Off. | G06F 3/12 |
| 9411804 | 5/1994 | WIPO | |

OTHER PUBLICATIONS

Frank Hayes; "The Printers Talk Back"; Dec. 1993; pp. 1–5.
HP JetDirect Network Interface Configuration Guide, Hewlett–Packard Manual Part No. J2371–90001, 1993, pp. iv–ix and Section 2 Software Installation and Configuration for Novell Netware Networks, pp. 2–2 through 2–18.
HP JetDirect EX External Network Interface Configuration Guide, Hewlett–Packard Manual Part No. J2382–90101, 1993, pp. 7–12 and Section 2 Novell NetWare Networks, pp. 2–2 through 2–36.
Lexmark WinWriter 600 User's Reference, Manual No. SA40–0779–00, 1993, Chapter 2 Using the Windows Printing System, pp. 11–26 and Chapter 3 Checking Print Status, pp. 27–39.
Network Printing Alliance Protocol, A Printer/Host Control Specification, Level 1, Revision N, Feb. 11, 1994, Developed By The Network Printing Alliance.

*Primary Examiner*—Edward Coles, Sr.
*Assistant Examiner*—Dov Popovici
*Attorney, Agent, or Firm*—Ronald K. Aust; John J. McArdle, Jr.

[57] ABSTRACT

Bidirectional communications between a host computer and a selected printer connected to the host, either locally or by way of a network, are used to provide a user of the host with access to a substantially real-time, visual and functional replica of the operator panel of the selected printer. A user at the host computer may also visually monitor the status of multiple printers at the same time from the same host display.

15 Claims, 7 Drawing Sheets

MULTIPLE PRINTER STATUS INFORMATION INDICATION

This Application is a continuation of 08/409,563 filed Mar. 23, 1995 abandoned.

FIELD OF THE INVENTION

This invention relates to the monitoring and control of printers serving one or more host computers. More particularly, this invention relates to providing status information for multiple printers at the site of one or more host computers in bidirectional communication with the printers.

BACKGROUND OF THE INVENTION

Printers receive print data from a source such as a host computer and generate a printed representation of that print data on a page. A printer can serve either single or multiple hosts. For example, a printer may be connected by cable directly to the serial or parallel port of the host to serve that host only. Alternatively, a printer interfaced to a network can be assigned to multiple hosts residing on that network. In either case, it is sometimes necessary or desirable that printers be located where they are not readily physically accessible or are obscured from the view of a user of a given host. It may then be inconvenient, or even impossible for such a user to view and use the operator panel of such a printer, or to directly observe the status of multiple printers available to the host.

Printer operator panels vary in configuration but generally provide both monitoring and manual control capability. Manual control may be carried out by way of control devices such as pushbutton switches which are in some cases permanently labelled and perform dedicated functions. Pushbuttons may also be positioned in relation to a liquid crystal or other display capable of providing changeable legends so that a single pushbutton can be associated with several variable functions. Status indications and other monitoring functions may be implemented with the aid of indicator lights, audible alarms and/or messages appearing on a menu-driven liquid crystal or other alphanumeric display. Such facilities typically provide control capabilities ranging from rudimentary power switching and indication of whether the printer is in an on-line or ready status to a variety of more sophisticated functions such as selecting paper size, paper source, font, point size, pitch, manual or automatic feed, print orientation, duplex (double sided printing) mode, lines per page, diagnostic testing and/or others. Monitoring functions may include providing any of a number of visual and/or audible indications informing a user of the condition or service needs of the printer. These indications may take the form of status messages such as "ready" or "busy" which indicate the current condition of the printer. They may also take the form of attendance messages such as "paper jam," "load paper," "toner low" or "top cover open" calling for intervention by the operator or service error codes indicating problems requiring the attention of a service technician.

Efforts have been made to provide network administrators and users with some capability to monitor and control a remote printer. Exemplary of these are the Hewlett-Packard Company software utilities known as JetAdmin® and Jet-Print®. JetAdmin® is an administrative utility for configuring, managing and troubleshooting Hewlett-Packard JetDirect® printers on a network such as Novell NetWare® network. Operable as either a Microsoft Windows application or as a DOS application, JetAdmin® allows a network administrator to perform a number of tasks relating to a printer located anywhere on the network. For example, the administrator can gather status information and display the operational status and connection status of a given printer on the screen of the host computer by using a mouse or other pointing device to select (i.e., "click on") the "status" button appearing thereon. A printer can also be remotely configured to operate either in a remote printer mode or a queue server mode. In the queue server mode, no separate print server is required. Print data from a host is communicated to a file server where it is spooled in a print queue. When the selected printer is available, a queue server running on the HP JetDirect® interface transfers the job to the printer for printing. In the remote printer mode, the print data spooled in the file server is copied to the selected printer by a dedicated print server. The JetAdmin® utility also permits a network administrator to add or delete queues or file servers and to remotely install, select or remove printer drivers. Clicking on a "Diagnostics" button presents a Printer I/O Diagnostics screen which includes buttons for specifying information to be displayed. A colored indicator to the left of each button is green when the item appears to be functioning normally and turns yellow in the event of a problem. Clicking on a "Test Page" button appearing on the Printer I/O Configuration screen permits a test page to be printed in any of a number of printer languages.

JetPrint® is a Microsoft Windows based utility which permits network users to perform "drag and drop" printing, view printer and interface status, install Windows drivers, set up a default print queue for all Windows jobs and assign sounds to selected printer events. To view the status of a network printer from the host, a user running JetPrint® selects a printer or print queue in order to display configuration information, list jobs queued or display printer status or printer description information. An icon in the form of a stoplight may be clicked on in order to display an explanation of the status of a printer on the network.

While the foregoing capabilities are useful, there are a number of problems which have not been recognized or solved by the prior art. For example, the JetAdmin® and JetPrint® utilities described above communicate by way of network command protocols. Consequently, these utilities function only with respect to printers coupled to a host by way of a network and lack ability to perform functions requiring bidirectional communication (such as the display of printer status, printer description, configuration and queue information) with a printer which may be connected to the host "locally" i.e., by way of direct coupling to a serial or parallel printer port of the host. As a result, a user may not be able to display the status, description or configuration of any printer available to their host.

Some prior art printers connected locally to a host have used bidirectional communications implemented with non-standard protocols to permit a user of the host to monitor and control the printer. For example, other than a power switch located elsewhere on the printer, the operator panel of the WinWriter 600 manufactured by Lexmark International, Inc. includes only pushbuttons labelled "Pause/Resume" and "Cancel" and four indicator lights labelled to show whether the printer is "ready" or is busy "printing" or requires "paper" or "service". All other monitoring and control functions are available through a graphical user interface generated by a Windows based utility running on the host. While printers of this type could be shared with network users to permit them to print jobs, the control and monitoring functions available to the user of the local host were not available to the network users.

A further shortcoming of the prior art which has not heretofore been recognized relates to so-called "human factors" considerations. In prior systems, printer monitoring and control functions available at either the operator panel of the printer or at a remote host have not been presented so that they look substantially the same to a user and are operated in substantially the same way irrespective of whether the user is dealing with the host or the actual printer operator panel. Consequently, a person familiar with the layout and operation of the printer operator panel would not necessarily know where to look for or how to use remote printer monitoring and/or control functions provided at the host without additional training. Conversely, a person familiar with these functions as presented at the host would not automatically be familiar with the layout and operation of the printer operator panel. This lack of consistency not only increases the need for training but also decreases efficiency and increases the likelihood of human error.

Another problem has been that printer status, configuration and condition information presented at any given time on the operator panel of a printer has not always been available substantially instantaneously at any host served by that printer, and vice versa. Consequently, complete, accurate and current information has not been available at the host and the printer operator panel simultaneously. To the extent status information relating to a networked remote printer has been available to a host, it has heretofore been necessary for the host to acquire that information by polling. This increases network traffic and thereby degrades the speed and performance of the network.

Yet another deficiency of the prior art is that it has not been possible to control certain printer settings using the normal data stream emanating from a host. For example, it has not heretofore been possible to change a printer's serial or parallel protocol from a remote host. The only way a user could do this previously was by being physically present at the printer and pressing the appropriate sequence of pushbuttons on the printer operator panel.

Similarly, the prior art has not permitted users to handle certain types of attendance messages from a remote host. Some attendance messages such as "paper jam" or "out of paper" by their nature demand that a person attend to the printer at the physical site of the printer itself. However, not all attendance messages inherently require such a degree of physical intervention by an operator. For example, an attendance message may advise that a particular font requested for a print job has not been downloaded to the printer and is therefore not presently available. Heretofore in order to permit the printer to substitute an available font, it has been necessary for a user to leave the host and travel to the physical site of the printer in order to press the appropriate button(s) on the printer operator panel.

SUMMARY OF THE INVENTION

The system described herein overcomes the above-described problems and deficiencies by providing the user of a host computer with access to a substantially real-time visual and functional replica of the operator panel of a printer available to that host. This replica can be provided whether the printer is connected to the host through a network or by a local connection. The present system thus provides the user, without leaving the host, with the ability to access and use all features of the printer operator panel to the same extent that a person could if physically present at the site of the printer itself. Using the replica generated on the display of the host, a host user can effectively "view" the actual printer operator panel in substantially real-time. The user may thus be informed of status, attendance or service messages appearing on the actual printer operator panel and have benefit of any operating instructions or prompts which may be available there. Using a mouse or other convenient input device, the user of the host can also effectively "actuate" the pushbuttons or other operator panel control devices depicted as part of the replica.

The replica (except perhaps for minor differences such as size, color and the like) has substantially the same visual appearance as the actual printer operator panel and to a user appears to operate in substantially the same way as well. Thus, a user who is familiar with the layout and operation of the actual printer operator panel does not require additional training in order to make use of the replica. By virtue of the consistency of visual and operational format between the actual printer operator panel and the replica, such a user will know where to look within the replica for desired information, how to interpret the legends, messages and/or instructional prompts presented by the replica and how to use all control functions available through the replica. Preferably, such control functions are selected to include the same set of functions as are available by way of the printer operator panel itself although, the replica may include additional or fewer functions if desired.

Due to the real-time nature of the replica in its preferred form, information appearing on the replica at any instant is identical or at least substantially identical to the information appearing on the actual printer operator panel at substantially the same instant. The true present condition of the printer is thus available to the host user as well as any person who may be attendant at the site of the printer. Moreover, any control actions initiated by either such user (through use of the replica) or by such attendant (through use of the operator panel itself) will be apparent to both persons at substantially the same time.

Significantly, the present system enables all of the monitoring and control functions which have been described to be implemented without necessity of the host polling the printer for information. By avoiding the communication traffic which polling would entail, the invention avoids degradation of network speed and performance.

In the embodiment to be described herein, the present system achieves the foregoing by augmenting an established printer-host communication protocol with certain command extensions. Using these command extensions, a Windows based utility running on the host presents a graphical user interface which mimics the operator panel of the printer using asynchronous bidirectional communications between the printer and host. Communications from printer to host inform the host computer whenever a change occurs on the printer operator panel. They also relay the updated operator panel information to the host for visual presentation by means of the graphical user interface. Communications from host to printer enable a user of the host to effectively actuate the pushbuttons or other control devices represented on the graphical user interface. Such actuations, whether single, sequential or combinational, result in the same response by the printer as would similar actuations of the physical control devices on the printer operator panel. The printer operator panel and its replica at the host also respond identically and at substantially the same time to either operator panel control device actuations or their virtual counterparts initiated through the graphical user interface at the host.

In accordance with the present invention, the described system also provides the ability for a user at a host to visually monitor the status of multiple printers at the same time from the same host display. In order to do this, the host display is capable of showing a list of printers available to the host in which changes in state of any of the printers are shown.

These and other aspects of the invention, its structure and use will be made even more clear to the person of ordinary skill in the art upon review of the following detailed description and the appended drawings in which like reference numerals designate like items and which are briefly described below.

DETAILED DESCRIPTION OF A PREFERRED EMBODIMENT

Figure 1:
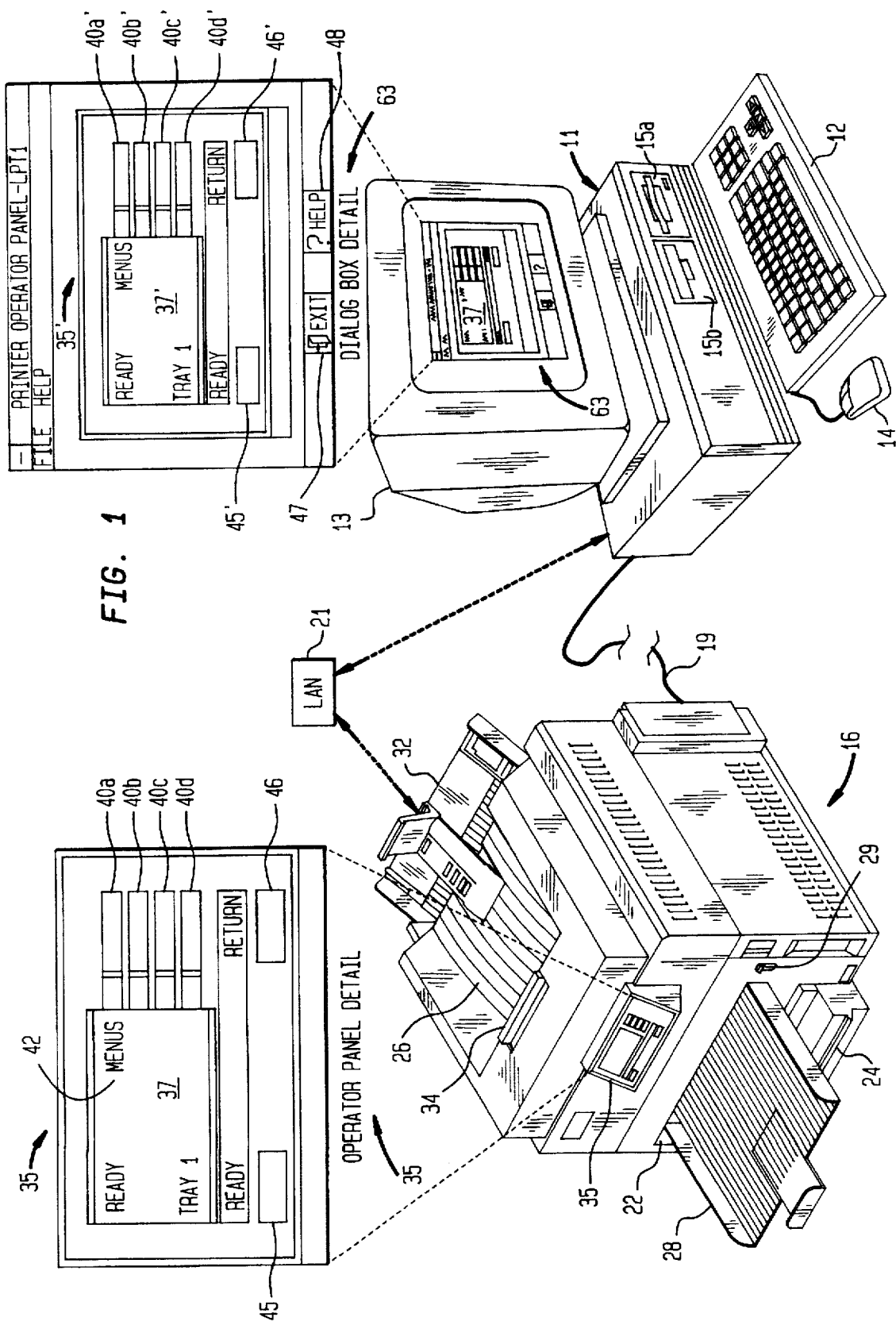
FIG. 1 is a partially diagrammatic, partially pictorial perspective illustration of a host computer and printer in bidirectional communication according to the present invention.

With reference to FIG. 1 there is shown a typical host computer 11 connected to a keyboard 12 and a video display 13. Host 11 is also preferably connected to a mouse 14 and/or other suitable pointing device(s) such as a touch screen, trackball, joystick or other device capable of "clicking on" or otherwise indicating and selecting features appearing on display 13. Host computer 11 may suitably comprise a personal computer, preferably an IBM-compatible type including an Intel 80X86 microprocessor (not shown), 80386 or higher. Host computer 11 will also typically include an internal hard drive or other suitable program memory, 3.5 inch and/or 5.25 inch removable disk drives 15a and 15b, respectively, for uploading and downloading programs and data. Host 11 also includes a sufficient amount of internal random access memory (RAM) to support its operating system as well as all applications and utility software desired to be run on host 11. Host 11 is also connected to printers such as the printer 16 which may either be connected to host 11 locally, such as by a Centronics® cable 19 coupled to a parallel port of host 11 or by way of a local area network (LAN) 21 through an appropriate commercially available network card (not shown) installed in an available expansion slot of host 11. A printer 16 installed on a network 21 is connected to the network by way of an internal network adapter card (INA) (not shown) preferably of the type described in co-pending commonly-assigned U.S. patent application Ser. No. 08/350,860, now U.S. Pat. No. 5,550,957, entitled MULTIPLE VIRTUAL PRINTER NETWORK INTERFACE filed Dec. 7, 1994 which is expressly incorporated herein by reference in its entirety. Printer 16 may be physically located at a site nearby or remote from host 11 and may or may not be in convenient operating and viewing proximity to a user of host 11.

Printer 16 will typically include a power on/off switch 22, a paper tray 24 for holding a supply of blank pages as well as an output bin 26 and/or a front exit tray 28 for receiving finished printed pages. Where more than one such paper exit path is available as shown, an exit path selection switch 29 can be provided for selecting delivery of printed pages either to bin 26 or tray 28. For convenience of loading blank pages of a special nature such as envelopes, transparencies or unusual sizes of paper, a manual feed tray 32 may also be provided. Access to the paper feed path and user-serviceable mechanisms of printer 16 may be gained by way of a cover latch 34. In the preferred embodiment, printer 16 is a laser printer but for purposes of the invention, the type of print head employed by printer 16 is immaterial. The invention is equally applicable to other electrophotographic printers as well as ink jet, wire matrix and other types.

Printer 16 will also typically include an operator panel 35 having one or more indicator lights and/or an alphanumeric display for providing information to a human operator. Such information may comprise status messages, attendance messages, service messages, instructions and/or prompts. Operator panel will also include one or more control devices such as selector switches, pushbuttons or others useful for controlling the operation of printer 16.

For example, in the preferred embodiment as illustrated in FIG. 1 the operator panel includes a four (4) line liquid crystal alphanumeric display 37. Located to the right of display 37 is situated a column of four (4) variable function pushbuttons 40a, 40b, 40c and 40d, one of which is positioned in horizontal alignment with each line of display 37. Display 37 is preferably menu driven and is capable of changing the information displayed thereon based upon the present state of printer 16 and the control actions initiated by an operator. Pushbuttons 40a through 40d are thus each capable of performing a variety of different functions, currently available ones of which are indicated by a changeable legend (e.g., legend 42) which may appear on display 37 just to the left of one or more pushbuttons 40a through 40d. Beneath the display, two dedicated functions are available through a "Ready" pushbutton 45 and a "Return" pushbutton 46 whose legends are permanently labelled. The internal controller of printer 16 as relevant to the present invention will be described in detail further below.

The host 11 is provided with a software utility program which, in cooperation with the controller of printer 16 to be described, facilitates bidirectional communication between host 11 and printer 16 in order to provide a user of host 11 with access to a replica 35' of operator panel 35. This program may conveniently be supplied in a form stored on magnetic media such as a 3.5 inch floppy disk which can be inserted into drive 15a and downloaded to the internal hard drive of host 11. Replica 35', except perhaps for differences of message attributes such as blinking or underlining of characters or differences of size, scale, typefaces, colors and the like, is presented on the display 13 of host 11 in the form of a graphical user interface which substantially mimics (preferably, faithfully) the visual appearance and externally apparent operating characteristics of printer operator panel 35. In a manner analogous to printer operator panel 35, replica 35' includes a display field 37' for providing four lines of alphanumeric information as provided by display 37. Likewise, replica 35' includes a column of four variable function button fields 40a', 40b', 40c' and 40d' sized and located in positions corresponding to the variable function pushbuttons 40a, 40b, 40c and 40d of printer operator panel 35. Replica 35' also includes a field 45' labelled "Ready" and field 46' bearing the legend "Return". These fields 45' and 46' are sized and located to resemble the pushbuttons 45 and 46, respectively of printer operator panel 35. The described system is used to the greatest advantage within operating environments using a graphical user interface such as Microsoft Windows or IBM OS/2® which effectively permit executing multiple applications simultaneously.

Figure 2:
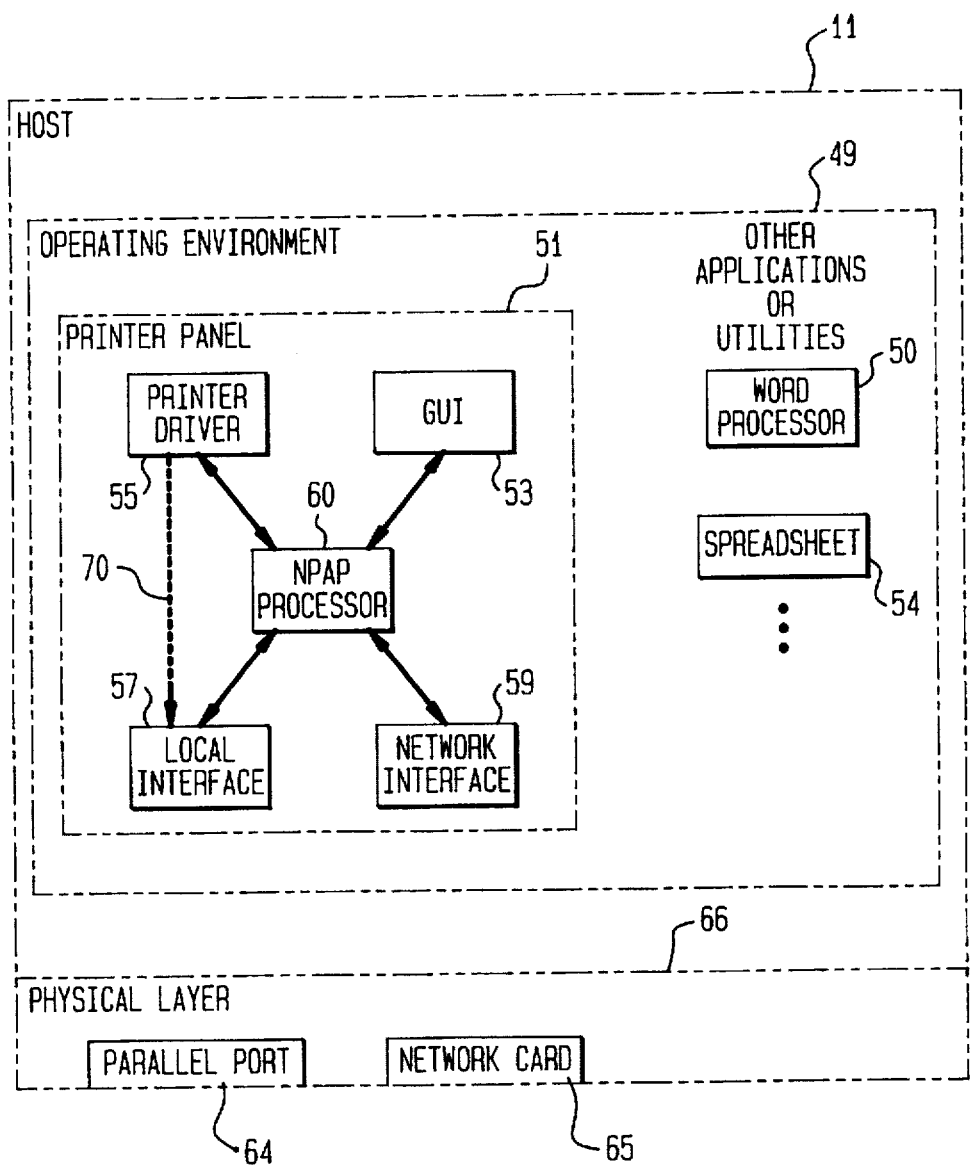
FIG. 2 is a block diagram illustrating a preferred software architecture for the host computer of FIG. 1.

Referring to FIG. 2 there is illustrated a suitable software architecture of host computer 11. In the preferred embodiment, host 11 runs a suitable version of Microsoft DOS, preferably version 6.0 or higher, within an operating environment 49 defined by Microsoft Windows 3.1 or higher. The invention is implemented in part using a utility software program hereinafter referred to as Printer Panel 51 stored within the program memory of host 11 and capable of running within the operating environment 49. Other applications or utility programs such as a word processor 50, spreadsheet 54 or others, which of themselves form no part of the invention, may reside in other areas of the program memory of host 11 and run substantially simultaneously with Printer Panel 51. In such a multi-tasking environment, Printer Panel 51 can generate replica 35' in order to provide a user of host 11 with information relating to a printer 16 while the user is, for example, printing a document created using another application such as a word processor 50.

As FIG. 2 indicates, Printer Panel 51 may be described as a plurality of separate but intercommunicating software substituents. Those include a Graphical User Interface (GUI) 53, a Printer Driver 55, a Local Interface 57, a Network Interface 59 and an NPAP Processor 60 to which each of the foregoing is linked. The Network Printer Alliance Protocol (NPAP) is a published protocol specification Level 1, Revision N of which dated Feb. 11, 1994 is expressly incorporated herein by reference in its entirety. The NPAP specification defines a bidirectional mode of communication between a host and a mutually compatible printer as a means of returning printer status information to the host. Copies of NPAP are presently available via anonymous FTP from ftp ftp.lexmark.com [192.146.101.4]. The preferred embodiment described herein is implemented using command extensions of NPAP as will be explained in further detail below.

GUI 53 is a Windows compatible program which paints various screens including the screen having replica 35' on the display 13 of host 11. All relevant user control inputs are received through GUI 53 and all user information related to any printer 16 available to host 11 is displayed by way of GUI 53. GUI 53 makes use of conventional Microsoft Windows Applications Program Interfaces (APIs), to paint the screen 13 of host 11 with a dialog box such as the dialog box 63 depicted in FIG. 1. Dialog box 63 includes not only the operator panel replica 35' already described but also preferably button fields 47 and 48 labelled and/or provided with icons which may be selected to "exit" or refer the user to such "help" information or instructions as may be desired. It may be desired to provide printer functions in addition to those available through dialog box 63. To do so, GUI 53 conveniently generates a main utility screen such as that of FIG. 8 having a button bar 301 including a separate button field such as 302 (Printer Op Panel) labelled and provided with an icon identifying each available dialog box, such as dialog box 63. Using keyboard 12, mouse 14 or other suitable input device coupled to host 11, a user may "click on" or otherwise select a desired button in order to make the corresponding dialog box appear on display 13.

NPAP Processor 60 is a Windows Dynamic Link Library (DLL). A DLL is a collection of routines or functions which any program running within Windows operating environment 49 can access thereby permitting code to be shared among a multiplicity of programs. In the preferred embodiment, NPAP Processor 60 facilitates bidirectional communication between host 11 and one or more printers 16 capable of parsing and sending commands and information in accordance with NPA protocols. As will be explained further, NPAP Processor 60 implements functions which can be called by GUI 53 to take printer commands or requests for printer information and translate them into NPAP-compliant format. NPAP Processor 60 also implements functions for receiving information concerning printer 16 in NPAP-compliant format, removing the NPAP formatting or "wrapper" and relaying the information to GUI 53 and/or Printer Driver 55. NPAP Processor 60 communicates with one or more printer(s) 16 by way of Local Interface 57 and/or Network Interface 59 depending on whether such printer(s) 16 are connected to the physical layer 66 locally, such as by way of a parallel port 64, or by way of a network card 65 linking host 11 to a network such as LAN 21.

Printer Driver 55 is also a form of DLL. Its primary task is to convert Windows Graphics Device Interface (GDI) calls to commands which can be properly interpreted by a printer 16, since the GDI is a general graphics interface and not directly compatible with any specific printer datastream.

One Printer Driver 55 used in the preferred embodiment is a PostScript® driver. Once a print job has been transcribed into PostScript® format it is loaded into a buffer. Alternative paths exist for transferring the job from this buffer to a locally-attached designated printer 16. One path which Printer Driver 55 uses is to issue an "open" request to NPAP Processor 60. If the designated printer 16 is not NPAP-compliant, NPAP Processor 60 responds to the "open" request with a "fail" indication whereupon an alternative path 70 is selected as will be described below. However, if the designated printer 16 is of an NPAP-compliant type, a "write" request initiates transfer of the contents of the buffer to NPAP Processor 60. NPAP Processor 60 transforms each block of the PostScript® datastream data into NPA-compliant format by associating it with an NPAP "wrapper" to form an NPAP information packet.

If the locally-attached designated printer 16 is not NPAP-compliant and a "fail" indication is returned to Printer Driver 55 by NPAP Processor 60, Printer Driver 55 routes the print job by way of an alternate path 70 to Local Interface 57 for ultimate transmission to printer 16 by way of local port 64. If the printer resides on a network such as LAN 21, the print job is transferred to it by way of the normal Windows print spooler (not shown).

Optionally, Printer Driver 55 may itself be externalized to a user of host 11 through a graphical user interface appearing within a dialog box. Such a dialog box, while being separate and distinct from dialog box 63 may conveniently be invoked by a button appearing on the same button bar as that referred to earlier. Using such an interface, a user may obtain some configuration information from the printer. Printer Driver 55 is capable of obtaining this configuration information from any NPAP-compliant printer 16 available to host 11. The bidirectional communications used to implement these functions will be more clearly understood in light of the description of the similar communications used to implement operator panel replica 35' as explained in further detail hereinafter.

Local Interface 57 of the preferred embodiment is a Windows Virtual Device Driver (V×D) which performs the task of encapsulating bidirectional communication functionality for one or more printers 16 which may be connected to parallel port 64. These communications are carried out in conformance with "Standard Signalling Method for a Bidirectional Parallel Peripheral Interface for Personal Computers" IEEE 1284-1994 which is expressly incorporated herein by reference in its entirety. Local Interface 57 is indifferent to the content of information it relays between NPAP Processor 60 and any locally connected printer(s) 16 and host 11. Accordingly, such information may include NPAP commands or data in NPAP wrappers. Local Interface 57 may also operate in a uni-directional mode in which it may be used to transfer information directly from Printer Driver 55 via path 70 to a locally attached printer 16.

Network Interface 59 is also a Windows Dynamic Link Library (DLL) which facilitates bidirectional communications over a network such as LAN 21 which may suitably comprise a Novell Netware® or other desired network. Network Interface 59 operates by encapsulating NPAP information packets received from NPAP Processor 60 within standard Novell Netware® or other specified protocols prior to transmitting them to LAN 21 through network card 65. Similarly, Network Interface 59 strips such network protocol information away from communications received from network card 65 prior to transferring any underlying NPAP information packets to NPAP Processor 60. Network Interface 59 may support one or more printers 16 simultaneously thereby virtualizing one printer at a time for the applications or drivers operating through NPAP Processor 60. If desired, multiple network interfaces 59 served by a single NPAP Processor 60 may be provided, with each such network interface being compatible with a different network protocol.

A significant advantage of the software architecture of host 11 as described above is that GUI 53 remains independent of the various different network protocols through which one or more printers 16 may be made available when Printer Panel 51 is running. GUI 53 also remains independent of NPAP or other bidirectional communication protocol which may be used. Thus, while NPAP with certain command extensions is used to implement the invention in the preferred embodiment described herein, bidirectional protocol-specific operations are handled by NPAP Processor 60. Consequently, GUI 53 is not limited by any dependencies upon the bidirectional communications protocol. Having described the structure and function of host 11 and its associated software, the control of printer 11 as relevant to the present invention will now be considered.

Figure 3:
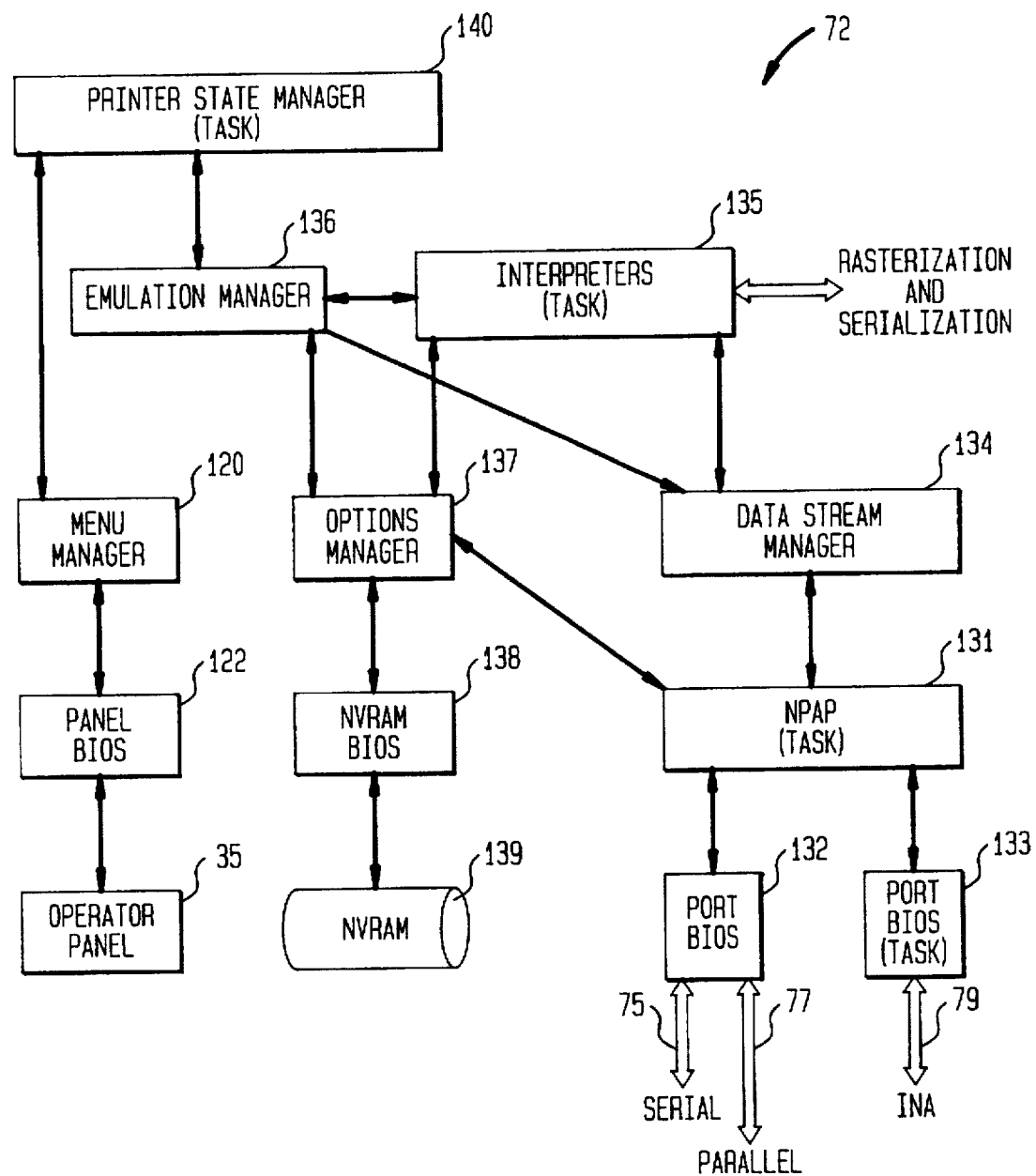
FIG. 3 is a functional block diagram of a controller for the printer of FIG. 1 as relevant to the present invention.

Referring to FIG. 3, a printer 16 according to the present invention includes a microprocessor-based controller 72, the relevant portions of which are shown functionally. Controller 72 performs functions which include a number of tasks, the relevant ones of which are indicated in the figure, and a number of libraries of software code which may be called by the tasks to perform functions in support of the tasks. Controller 72 is capable of effecting the usual printer functions not germane to the present invention including interpreting print jobs received in one or more printer control languages by way of serial port 75, parallel port 77 and/or internal network adaptor (INA) 79 and rasterizing and serializing the interpreted data to drive a print engine (not shown) in order to form a printed representation of the print data on a page.

As noted earlier, printer 16 includes an operator panel 35 which, in the preferred embodiment includes a four line, menu-driven alphanumeric display 37. Each line of display 37 is positionally associated with one of four respective variable function pushbuttons 40a, 40b, 40c and 40d. Changeable legends such as legend 42 appearing to the left of one or more of pushbuttons 40a, 40b, 40c and 40d indicate the function which, at any given time can be performed by actuating that pushbutton. Operator panel 35 also includes a dedicated "Ready" pushbutton 45 and a dedicated "Return" pushbutton 46. The former is used to return printer 16 to the "ready" status while actuation of the latter causes the previous menu level to appear on display 37. The changeable legends associated with variable function pushbuttons 40a through 40d may include those listed and explained in Table 1 below.

TABLE I

VARIABLE FUNCTION PUSHBUTTONS

| LEGEND | FUNCTION |
|---|---|
| STOP | Stops printing of current job after processing all paper currently in the paper path. |
| RESET | Stops current printer 16 operation and returns all settings to their user default values. The printer clears the print buffer and the paper path before resetting these values. |
| CONTINUE | Printer 16 resumes current operation. |
| SAVE | Printer 16 saves the currently selected value for the selected menu item. |
| PRINT BUFFER | The printer 16 prints the current page. The printer 16 had processed data but had not received an "end of job" message or "form feed" command. |
| MORE | Indicates that additional menu items or values are available. Display 37 will display the next screen of menu items or values. |
| MENUS | Display 37 displays a list of menus such as: PAPER MENU (paper size & source) FONT MENU (font name, source, size, symbol set etc.) SETUP MENU (specifies printer control, lines per page, language, timers, alarms, parallel and serial protocols, darkness etc.) TEST MENU (allows printing of test pages and samples of available font) |

Selecting the appropriate pushbutton 40a through 40d causes display 37 to show a list of selectable menu items. Pressing one of pushbuttons 40a through 40d selects a value for a menu item. An asterisk appears to signify that the value for the item is now a setting. Display 37 then clears, momentarily shows SAVED and returns to the previous list of menu items.

As FIG. 3 indicates, the hardware associated with operator panel 35, including display 37, pushbuttons 40a through 40d and pushbuttons 45 and 46, is interfaced to a Menu Manager 120 by way of a Panel BIOS 122. Menu Manager 120 determines the alphanumeric information to be presented on display 37. Operating essentially as a sequential state processor, the information which is to appear on display 37 at any given time is determined as a function of the present state of printer 16 as indicated by Printer State Manager 140, and any inputs received through Panel BIOS 122 as the result of actuation of any of pushbuttons 40a–40d, 45 and/or 46 of panel 35 or their virtual counterparts 40a'–40d', 45' and/or 46' which form a part of replica 35'.

Figure 9:
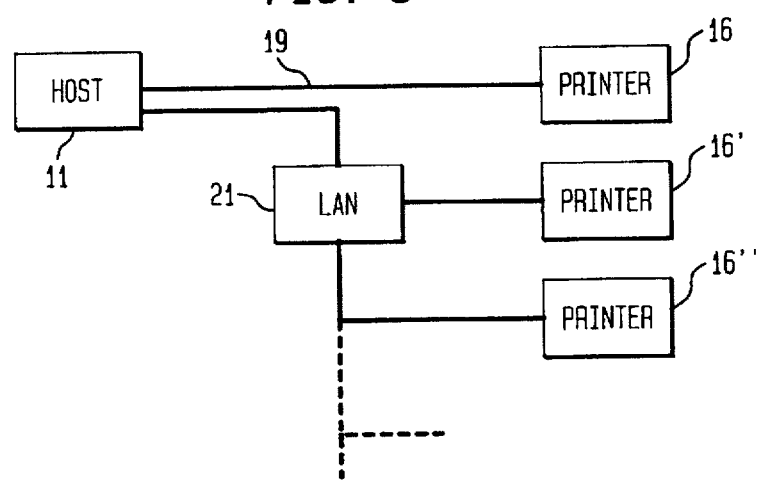
FIG. 9 is a block diagram of the host/printer connection of the present embodiment of the invention.

Controller 72 is capable of communicating bidirectionally with host 11 by way of at least one communication channel using NPAP. This communication channel may suitably comprise serial port 75, parallel port 77 or the LAN 21 coupled to the printer by way of INA 79. For example, as shown in FIG. 9, the printer 16 may be connected to the host 11 (via the parallel port 77 of the printer) by the cable 19. In addition, other NPAP-compliant printers 16' and 16" may be coupled through a LAN 21 to the host 11 utilizing a network adapter at each printer.

Except as otherwise noted, the remainder of this description concerns the exemplary situation in which the parallel port 77 of printer 16 is coupled to the parallel port 64 of host 11 by way of a Centronics® cable 19 or other standard parallel interface for IBM compatible personal computers in compliance with IEEE 1284-1994. The principal task for handling these NPAP-compliant communications is the NPAP task 131.

The NPAP Task 131 performs the functions of handling commands and data in the NPAP (Network Printing Alliance Protocol) format. The NPAP Task 131 supplies printer status information to any locally attached and/or network attached host computers 11 and receives requests for such information from the host computers 11. The NPAP Task 131 is activated periodically by a timer. When activated, NPAP Task 131 calls the Port BIOS 132 for the serial port 75, parallel port 77 and the Port BIOS 133 for the INA port 79 to determine if there is received data at one or more of those ports. If an NPAP command or command extension of the type to be described is received, the NPAP Task 131 responds through the appropriate port 75, 77, or 79 either directly or after obtaining needed information from another function in the printer controller 72. Before describing operation of the NPAP Task 131 in more detail, its state as being "on" or "off" will be described.

The NPAP Task may be "on", "off" or "auto" for each port 75, 77 or 79. If the NPAP Task 131 is "off", print data is directly provided from the Port BIOS 132 or 133 to the Data Stream Manager 134, as shall be described. If the NPAP Task 131 is "on", then only data in NPAP format will be passed through (after removal of NPA wrappers) to the Data Stream Manager 134, with other inputs being rejected. If the NPAP Task is in "auto" mode, the NPAP Task 131 is "on" until non-NPAP data (or commands) are received. Then the NPAP Task 131 is "off", and non-NPAP data is passed through to the Data Stream Manager 134. The NPAP Task 131 remains in pass-through mode until a "Start NPA Packet" command is received or until an end-job from a port protocol occurs.

When none of the interpreters 135 are running to provide data for subsequent rasterization and serialization in the printer, the Emulation Manager Task 136 looks for print data at a port 75, 77 or 79 to direct to the appropriate interpreter. In the absence of the NPAP Task 131, the Emulation Manager 136 calls Data Stream Manager 134 functions in order to transfer print data from the Port BIOS 132 or 133 to a buffer. If the NPAP Task 131 is "on" for a particular port, the Data Stream Manager 134 accesses data from an NPAP Task buffer for that port. The Emulation Manager 136 and Data Stream Manager 134 cooperate to associate a "job structure" with each print job received at a port 75, 77 or 79. The job structure is a data set associated with each print job and is held in memory for a time. The job structure includes an identification number for the print job, an area to record the number of sides of pages which have been printed, and information on resolution and other specifics. The job structure data is also capable of being modified during the printing process to update the status of the job. For example, as each side of a page to be printed is rendered by the print engine hardware, the job structure is modified to reflect completion thereof.

The Emulation Manager 136 also cooperates with the Data Stream Manager 134 to route each print job to the appropriate interpreter (such as a PostScript or a PCL interpreter) for that print job. The Data Stream Manager 134 passes the print job data in the appropriate language to a selected one of Interpreters 135 until the end of the job, whereupon the Data Stream Manager 134 provides an end-of-job condition to the interpreter. When the interpreter is finished with the print job, it indicates the idle state to the Emulation Manager 136. As each page is rendered, the page is provided to a graphics engine software and print mechanism hardware (not shown) for eventual rasterization of the pages to be printed and serialization of the bit map information to the print mechanism (not shown).

The Options Manager Library 137 is a print job data structure manager which provides a high level interface, through NVRAM BIOS 138, to non-volatile RAM (NVRAM 139) in the printer. Options Manager 137 is used by the Emulation Manager 136 and the interpreters in creating job structure information where such information is derived from values stored in NVRAM 139. The NPAP Task 131 also can communicate with the Options Manager 137 to read and write NVRAM 139 settings.

The Printer State Manager 140 is the task which first learns of events external to the code of controller 72 which may occur to printer 16. The Printer State Manager 140 notes, for example, if the printer cover has been opened and orchestrates providing this information to the operator panel 35 and to any other users of such information such as the NPAP Task 131. The Printer State Manager 140 will become aware of certain conditions due to hardware interrupts to the microprocessor of printer 16, while other status information is checked by the Printer State Manager 140 on a polling basis. Printer configuration changes, Device Status Alerts, and changes to the printer operator panel 35 are passed from the Printer State Manager 140 to the NPAP Task 131 for communication to attached host computer 11 using NPAP.

The NPA protocol (NPAP) is a protocol which not only defines specific NPAP commands but which also permits other forms of commands or data to be associated with a so-called NPA "wrapper" in order to permit NPAP commands or command extensions to be interspersed within the normal data stream transmitted by way of ports 75, 77 or 79. When active, NPAP Task 131 is capable of recognizing and capturing NPAP commands or command extensions from the data stream for special processing while permitting other information to be processed in the usual way by Data Stream Manager 134. As indicated in FIG. 3, NPAP Task 131 is capable of communicating with Options Manager 134 in order to read data from or write information to NVRAM 139. NPAP Task 131 may also access and modify stored job structure information.

An NPAP communication packet is a structured field of digital information. An NPAP packet includes a start of packet byte, a two byte length field, a flag byte, and a command byte, followed by a sub-command and/or data fields and associated error checking. To facilitate description herein, the error checking bytes which may be placed at the end of a packet in a conventional manner will be omitted.

The packet structure is then:

| START | LENGTH | FLAG | COMMAND | DATA |
|-------|--------|------|---------|------|
| A5    | XX XX  | XX   | XX      | XX--- |

The entries for the fields are eight bit bytes shown in hexadecimal (hex) notation. So, for example, the "start of packet" byte for an NPAP packet is hex A5 (decimal 165).

The packet length field is a two byte word indicating the number of bytes in the packet, not including the length field itself or the start of packet byte. The NPAP default value for maximum packet size is 64 bytes. Host 11-to-printer 16 packets are often shorter, usually six to eight bytes long. As an example, a packet length of six bytes would be indicated as 00 06. The NPAP Protocol identifies a command that permits host 11 to set the maximum packet length that host 11 will accept. Typically, if host 11 is communicating via a network such as LAN 21, the maximum receive packet size is set to the packet size of the communication protocol used by the network. If a response from printer 16 is longer than that packet size, NPAP Task 131 splits the response into two or more acceptably sized packets. NPAP Task 131 indicates that the next packet is a continuation of the current one by setting bit 5 in the packet's flag byte.

In the case of messages from the host 11 to the printer 16, the purpose of the flag byte is to provide a single byte which the printer 16 can examine to obtain control information. Each bit of the flag byte may be defined so that there is a meaning if the bit is set (logic one) or cleared (logic zero). For present purposes, the bits four and six are of interest (where bit zero is the least significant bit and bit seven is the most significant bit). Bit six, if set, indicates that the packet contains a message to be processed by the NPAP component of the printer controller. If bit six is cleared, the packet contains data for a printer interpreter. Bit four, if set, calls for a response from the printer 16. If, for example, both bits four and six are set (and no other bits are set), the flag byte is hex 50.

In the case of communication from the printer 16 to a host 11, the purpose of the flag byte is to provide a single byte which the host 11 can examine to obtain control information for the message and a quick view of the status of printer 16. As in the case of communications from a host 11 to the printer 16, the flag byte contains individually defined bits. Of present interest, bit six, if set, indicates that the message is from the NPAP Task 131 of the printer controller 72. Bit four, if set, means that the reply was required by the host 11 (solicited via flag bit four in the message from the host). Bits zero and one are set to the state the printer 16 is in at the time the reply is sent from the printer. The meanings of the conditions of these bits (bit one-bit zero) are: 00—printer 16 is operable normally with no alert conditions, 01—printer is operable but there is a condition the operator may want to know about (such as a low toner warning), 10—a condition exists which will prevent further printing which can be remedied by the operator, and 11—condition exists which will prevent further printing and which can be remedied only by a service/repair call.

Returning to the format of a host 11-to-printer 16 NPAP packet, the fifth byte is a command byte, whose meaning is dependent upon the state of bit six in the flag byte. If flag bit six is set, the command byte contains a command for the NPAP Task 131 of the printer controller 72. If flag bit six is cleared, the command byte contains a logical unit designation for printer controller 72.

In the case of a printer 16-to-host 11 reply message, the original command or logical unit identification of the host 11-to-printer 16 message that caused the reply is returned. If the message from the printer 16 is unsolicited (flag bit four cleared and flag bit six set) and the command byte is FX, then the packet represents an alert of type FX. For example, a Device Status Alert (DSA) is indicated by a command byte of FF.

For packets emanating from a host 11, the data bytes following the command byte have a meaning which is dependent upon flag bit six. If flag bit six is set, the data field contains either data or a command modifier, dependent on the command, for the NPAP Task 131 of printer controller 72. If flag bit six is cleared, the data field contains data for the input queue of a logical unit within printer controller 72.

In the case of NPAP packets emanating from the printer 16, when flag bit six is set, the data field contains Alert data for an FX command byte or the packet contains error information or the data field contains a command response as called for by the command returned in the command byte (flag bit four set). When flag bit six is cleared, the data field contains a message from a Logical Unit within controller 72 (such as an interpreter 135) and byte five identifies the Logical Unit from which the message originates.

The published NPA protocol defines a number of commands and subcommands. These include various types of "alerts" intended to be transmitted from a printer 16 to a host computer 11. These are useful for communicating standard error conditions or printer state changes. The NPAP protocol also provides the ability for users to define unique alert conditions using command extensions. The remote operator panel function of the present invention is implemented using two main types of command extensions:

1.) Push Operator Panel Button—E0 E0
2.) Operator Panel Control/Monitor—E0 E1

The Push Operator Panel Button command extension, E0 E0, is used to permit a user of host 11, to use keyboard 12, mouse 14 or other pointing device to move a cursor on display 13 to the location of any of the pushbutton fields 40a', 40b', 40c', 40d', 45' or 46' on the operator panel replica 35' presented by GUI 53 and select same with the same effect as actuating a corresponding one of the pushbuttons 40a, 40b, 40c, 40d, 45 and/or 46 located on the operator panel 35 of printer 16. An NPAP command extension packet transmitted by host 11 in response to such action by the user takes the form:

A5 00 06 50 E0 E0 [id1] [id2] [xx]

where [id1] and [id2] identify a particular host 11 which has sent an Enable Replica Control command E0 E1 01, and where [xx] is a bit mask identifying a particular one of the pushbuttons on operator panel 35 as follows:

| Bit 0 | → | not used |
| Bit 1 | → | pushbutton 40a |
| Bit 2 | → | pushbutton 40b |
| Bit 3 | → | pushbutton 40c |
| Bit 4 | → | pushbutton 40d |
| Bit 5 | → | pushbutton 46 (Return) |
| Bit 6 | → | pushbutton 45 (Ready) |
| Bit 7 | → | not used |

Setting any of these bits to a logical "1" value indicates a single make and break of the corresponding pushbutton. Printer 16 acknowledges receipt of a Push Operator Panel Button command extension by responding to Host 11 with one of the following packets:

A5 00 05 50 E0 E0 [id] [id2]—SUCCESS
A5 00 03 D0 E0 E0—Denied
A5 00 03 D4 E0 E0—Bad button bit mask A "Denied" response indicates that another host 11 presently has control and that the request must be retried at a later time.

The Operator Panel Control/Monitor command extension, E0 E1, is used to communicate information appearing in the display 37 of the operator panel 35 of printer 16 to the display field 37' associated with replica 35'. The Operator Panel Control/Monitor command extension encompasses the following subcommands:

00 Disable Replica Control

01 Enable Replica Control

02 Return Operator Panel Messages and Attributes (e.g., blinking or underlining of messages)

03 Arm/Disarm Operator Panel Change Alert (including attributes)

04 Return Operator Panel Messages Only

05 Arm/Disarm Operator Panel Change Alert (no attributes)

The NPAP command packets corresponding to these subcommands and the corresponding responses are as follows:

| | | Subcommand 00: Disable Replica Control | | |
|---|---|---|---|---|
| Byte | Value-Hex | Description | | Notes |
| | | Host Command | | |
| 1 | A5 | Start of Packet Byte | | Packet Header |
| 2 | 00 06 | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| 1 | 00 | Function: | Disable Replica Control | |
| 2 | Unsigned Word | Printer Assigned ID. | | |
| | | Printer Response | | |
| 1 | A5 | Start of Packet Byte | | Packet Header |
| 2 | 00 06 | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| 1 | 00 | Function: | Disable Replica Control | |
| 2 | Unsigned Word | Printer Assigned ID. | | |

| | | Subcommand 01: Enable Replica Control | | |
|---|---|---|---|---|
| Byte | Value-Hex | Description | | Notes |
| | | Host Command | | |
| 1 | A5 | Start of Packet Byte | | Packet Header |
| 2 | 00 04 | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| 1 | 01 | Function: | Enable Replica Control | |

| | | Subcommand 01: Enable Replica Control | | |
|---|---|---|---|---|
| Byte | Value-Hex | Description | | Notes |
| | | Printer Response | | |
| 1 | A5 | Start of Packet Byte | | Packet Header |
| 2 | 00 06 | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| 1 | 01 | Function: | Enable Replica Control | |
| 2 | Unsigned Word | Printer Assigned ID. | | |

| | | Subcommand 02: Return Operator Panel Messages and Attributes | | |
|---|---|---|---|---|
| Byte | Value-Hex | Description | | Notes |
| | | Host Command | | |
| 1 | A5 | Start of Packet Byte | | Packet Header |
| 2 | 00 04 | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| 1 | 02 | Function: | Return Operator Panel Messages and Attributes | |
| | | Printer Response | | |
| 1 | A5 | Start of Packet Byte | | Packet Header |
| 2 | Unsigned Word | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| n | ASCII | Panel Message String | | |
| n | Binary | Attribute data, if available | | |

The printer 16 Response to Subcommand 02 may comprise a plurality of packets since the maximum output packet size is 64 bytes and the message and attribute data sufficient to characterize any message appearing on 4-line display 37 is 160 bytes. The panel message data string (80 bytes) begins with the ASCII character at Row 1, Column 1 continuing through Row 4, Col 20 of display 37. The panel attribute data (80 bytes) follows the panel message data in the response. The attribute data would be the logical OR of the following bit masks, 0×80=blink, 0×10=underline, 0×00= normal. Front Panel Change Alert messages are exactly the same format as the Printer response to this command, except the Command Byte in the alert packet is 0×F0.

| Byte | Value-Hex | Description | | Notes |
|---|---|---|---|---|
| | | Host Command | | |
| | | Subcommand 03: Arm/Disarm Operator Panel Change Alert (including attributes) | | |
| 1 | A5 | Start of Packet Byte | | Packet Header |
| 2 | 00 05 | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| 1 | 03 | Function: | Arm/Disarm Operator Panel Change Alert with Attribute Data | |
| 1 | 0x00 | Disarm Operator Panel Change Alert | | |
| | 0x01 | Arm Operator Change Alert | | |
| | | Printer Response | | |
| | | Subcommand 03: Arm Operator Panel Change Alert (including attributes) | | |
| 1 | A5 | Start of Packet Byte | | Packet Header |
| 2 | Unsigned Word | Length in Bytes (does not include these 2 bytes nor the SOP byte) | | |
| 1 | Unsigned Byte | Flag | | |
| 1 | E0 | Command: | Extension | |
| 1 | E1 | Subcommand: | Opertaor Panel Control/ Monitor | Data Field |
| n | ASCII | Panel Message String | | |
| n | Binary | Attribute data, if available | | |
| | | Printer Response | | |
| | | Subcommand 03: Disarm Operator Panel Change Alert (including attributes) | | |
| 1 | A5 | Start of Packet Byte | | Packet Header |
| 2 | Unsigned Word | Length in Bytes (does not include these 2 bytes nor the SOP byte) | | |
| 1 | Unsigned Byte | Flag | | |
| 1 | E0 | Command: | Extension | |
| 1 | E1 | Subcommand: | Front Panel Control/ Monitor | Data Field |
| 1 | 03 | Function: | Arm/Disarm Operator Panel Change Alert with Attribute Data | |
| 1 | 00 | Disable Alert | | |

Operator Panel Change Alert messages have the same format as the Printer response to the Return Operator Panel Messages and Attributes (E0 E1 02) command extension.

| Byte | Value-Hex | Description | | Notes |
|---|---|---|---|---|
| | | Subcommand 04: Return Operator Panel Messages Only | | |
| | | Host Command | | |
| 1 | A5 | Start of Packet Byte | | Packet Header |
| 2 | 00 04 | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |

| Byte | Value-Hex | Description | | Notes |
|---|---|---|---|---|
| | | Subcommand 04: Return Operator Panel Messages Only | | |
| 1 | 04 | Function: | Return Operator Panel Messages | |
| | | Printer Response | | |
| 1 | A5 | Start of Packet Byte | | Packet Header |
| 2 | Unsigned Word | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| n | ASCII | Panel Message String | | |

| Byte | Value-Hex | Description | | Notes |
|---|---|---|---|---|
| | | Host Command | | |
| | | Subcommand 05: Arm/Disarm Operator Panel Change Alert (without attributes) | | |
| 1 | A5 | Start of Packet Byte | | Packet Header |
| 2 | 00 05 | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| 1 | 05 | Function: | Arm/Disarm Operator Panel Change Alert | |
| 1 | 0x00 | Disarm Front Panel Change Alert | | |
| | 0x01 | Arm Front Panel Change Alert | | |
| | | Printer Response | | |
| | | Subcommand 05: Arm Operator Panel Change Alert (without attributes) | | |
| 1 | A5 | Start of Packet Byte | | Packet Header |
| 2 | Unsigned Word | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| n | ASCII | Panel Message String | | |
| | | Printer Response | | |
| | | Subcommand 05: Disarm Operator Panel Change Alert (without attributes) | | |
| 1 | A5 | Start of Packet Byte | | Packet Header |
| 2 | Unsigned Word | Length in Bytes (does not include these 2 bytes nor the SOP byte) | | |
| 1 | Unsigned Byte | Flag | | |
| 1 | E0 | Command: | Extension | |
| 1 | E1 | Subcommand: | Operator Panel Control/ Monitor | Data Field |
| 1 | 05 | Function: | Arm/Disarm Operator Panel Change Alert | |
| 1 | 00 | Disable Alert | | |

Operator Panel Change Alert messages have the same format as the Printer response to the Return Operator Panel Message (E0 E1 04) Command.

When the Printer Panel program 51 loaded within host 11 begins running, its NPAP processor 60 attempts bi-directional communication with each potential NPAP printer found on the LAN 21 as well as with locally-attached printers. A potential NPAP printer such as 16, 16' or 16" is usually one having hard-coded model information placing it in a class of potentially NPAP-capable printers recognizable by host 11. In the preferred embodiment, the attempted bi-directional communication is accomplished by sending a non-printable, non-NPAP command to each printer, followed by sending an NPAP command to those potentially NPAP-capable printers which respond to the first command. In practice, various techniques can be employed for determining if NPAP functionality is "on" at a particular printer, such as sending a request for status information and determining if an appropriately-formatted NPAP reply is received.

After establishing the identification of all connected NPAP-capable printers such as 16, 16' and 16" by communicating in NPAP commands, the NPAP Processor 60 of Printer Panel 51 requests device characteristics from each NPAP printer. NPAP Processor 60 also sends the appropriate NPAP commands to register for device status alerts and printer configuration changes of interest to Printer Panel 51.

Figure 8:
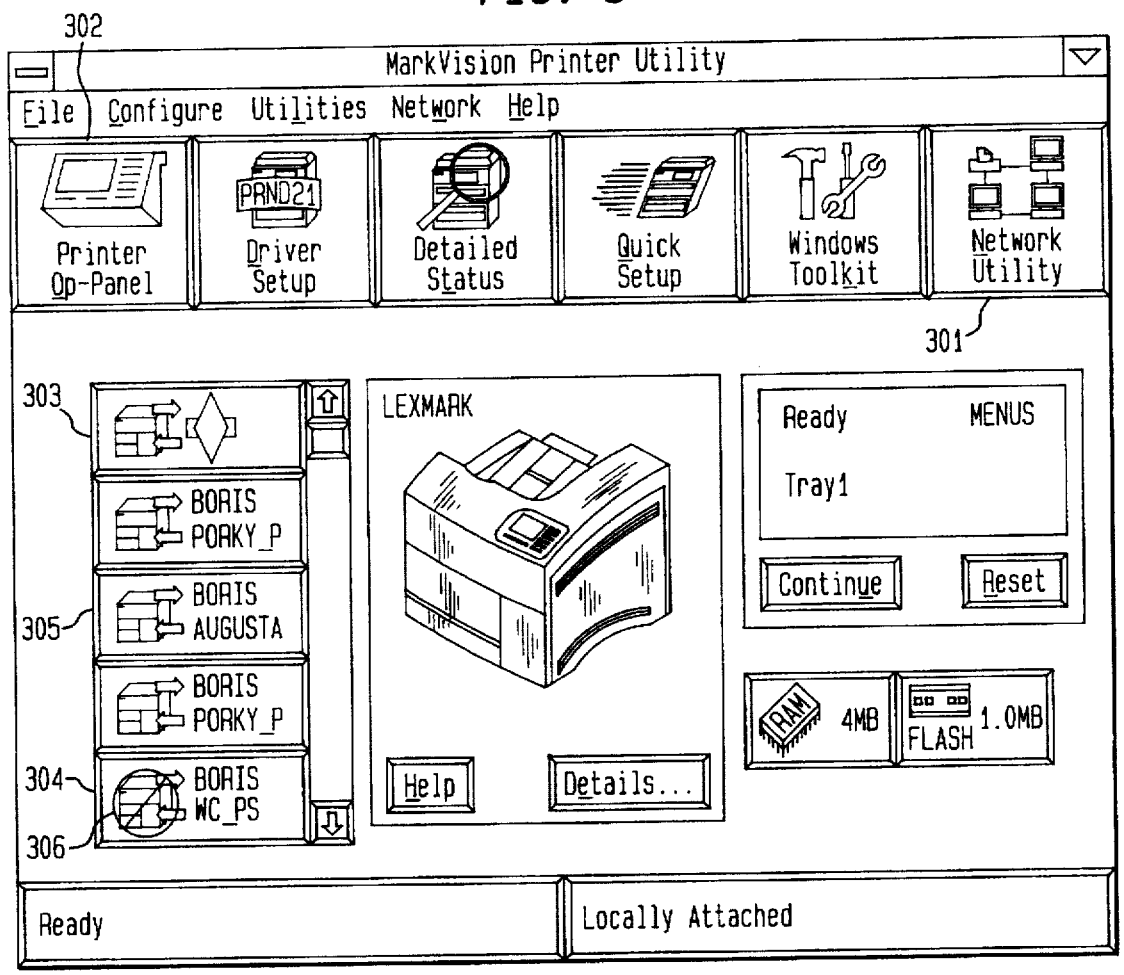
FIG. 8 is a pictorial illustration of a main utility screen for the GUI of the present invention.

In interfacing with a user through the display 13 of host 11, the main utility screen such as that of FIG. 8 available using the Windows program referred to herein as Printer Panel 51 provides a list of available printers such as 16, 16' and 16" and displays more detailed information concerning the "active" printer, which shall be regarded for exemplary purposes as the printer 16. In FIG. 8, buttons 303, 304 and 305 correspond to printers 16, 16' and 16", respectively. In the figure, the button 303 has been selected; and more detailed information for the "active" printer 16 is displayed.

The active printer 16 is a printer selected by the user or (by default) the first printer on the list of printers appearing on the main utility screen. The active printer in the general case may be one connected to the host 11 by way of local interface 57 or network interface 59. The Printer Panel 51 registers for updates of the operator panel 35 of the active printer 16 in addition to registering for the alerts and configuration changes indicated above. NPAP Processor 60 issues the "Return Operator Panel Messages Only" subcommand (Subcommand 04 described above) to the active printer 16. The active printer 16 responds by returning the ASCII data presently appearing on the display 37 of its operator panel 35 to host 11 in the two NPAP packets described above. NPAP Processor 60 removes the NPAP wrappers and transfers the ASCII data to GUI 53. As noted earlier, the main utility screen associated with Printer Panel 51 includes a button bar 301 which includes a plurality of "buttons" each containing an icon identifying an available dialog box. When the "button" 302 corresponding to dialog box 63 is selected, the main utility screen is replaced with the dialog box 63 shown in FIG. 2. GUI 53 operates to transfer the current ASCII display information received from printer 16 to the display field 37' associated with replica 35'. Replica 35' displays this information to the user of host 11 in the same 4-line format in which it appears on the display 37 of the operator panel 35 of printer 16.

Host 11 also sends an Enable Replica Control command extension (Subcommand 01 discussed above) to the active printer 16. Assuming this command extension is successfully received by the active printer 16, the printer responds with a packet of the form:

A5 00 06 50 E0 E1 01 [id1] [id2]

where [id1] and [id2] are an identification assigned by the active printer 16 to identify the particular host 11 which sent the Enable Replica Control command extension. This identification is presented in subsequent communications to avoid the possibility of printer 16 responding to button push commands originating from other hosts.

So that host 11 may be promptly informed of any subsequent changes in the state of operator panel 35, host 11 issues an "Arm Operator Panel Change Alert". Where no attribute information is desired the host 11 packet would take the form:

A5 00 05 50 E0 E1 05 01

After immediately returning the response enumerated above, an indefinite period of time may elapse before an event concerning printer 16 takes place which is to be reported to host 11 or before a user of host 11 selects one of the pushbutton fields 40a'–40d', 45' or 46' associated with replica 35'. An event which printer 16 reports to host 11 may result from a change in the operating condition or status of the printer (e.g. a paper jam) or from an operator input in the form of actuation of one of the pushbuttons 40a, 40b, 40c, 40d, 45 and/or 46 on the operator panel 35 of printer 16. Significantly, host 11 need not poll any of the printers 16 to which it is connected in order to determine when such an event takes place.

Figure 4:
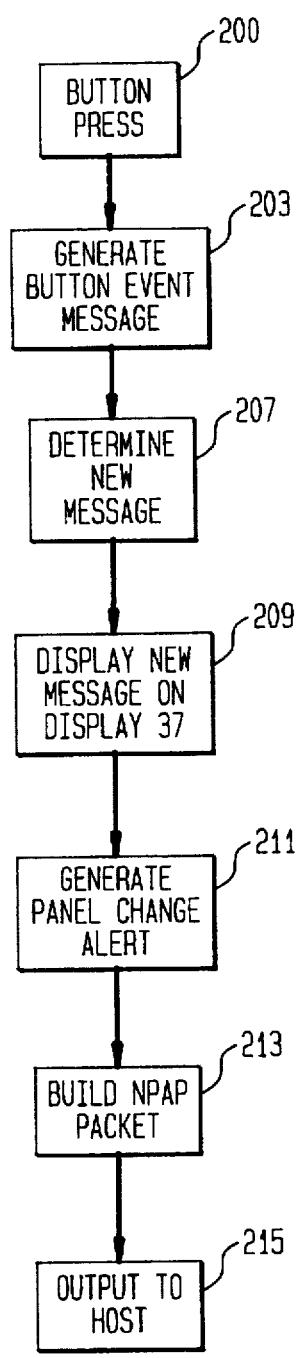
FIG. 4 is a flowchart illustrating the operation of the printer shown in FIG. 1 when a button on the operator panel of the printer is actuated.

FIG. 4 illustrates the operation of printer 16 when any of the pushbuttons 40a–40d, 45 or 46 located on its operator panel 16 is pressed as indicated at step 200. Pressing of one of the pushbuttons just mentioned generates an electrical signal which initiates an interrupt to the microprocessor within printer 16 which is used to implement controller 72. In response to the interrupt, Panel BIOS 122 generates the appropriate Button Event Message to identify which particular one of the pushbuttons 40a–40d, 45 or 46 has been pressed as indicated at step 203. As indicated at 207, Menu Manager 120 determines which, of a predetermined plurality of stored messages, is next to appear on display 37. This is decided based on the present state of printer 16 as indicated to Menu Manager 120 by Printer State manager 140 and which button has been pressed according to the Button Event Message received from Panel BIOS 122. Panel BIOS then outputs the new message to operator panel 35 where it is displayed on display 37 according to step 209. When the new message appears on display 37, Printer State Manager 140 generates a panel change event message at step 211. This message indicates that a change in the message displayed on display 37 has occurred but does not necessarily indicate the changed data itself. Having previously registered to receive such messages, NPAP task 131 is informed of the panel change message. In response, NPAP task retrieves the new message data from memory and builds an NPAP packet known as an Operator Panel Change Alert as indicated at step 213. This Operator Panel Change Alert may take the form of three packets as follows:

A5 00 3D 60 F0 E1 [data]
A5 00 3D 60 F0 [data]
A5 00 2D 40 F0 [data]

According to step 215, the packets making up the Operator Panel Change Alert are than transmitted to host 11 through Port BIOS 132 or Port BIOS 133. Depending on the manner in which the active printer 16 is connected, the Operator Panel Change Alert is received at host 11 either by way of parallel port 64 and local interface 57 or by way of network card 65 and network interface 59. In either case, the Operator Panel Change Alert message is relayed to NPAP Processor 60 via host 11.

With additional reference now to FIG. 5, the processing of the Operator Panel Change Alert by host 11 will now be described. As indicated at step 220, NPAP processor initially checks the syntax of any incoming message to ensure it constitutes a valid NPAP communication. Assuming the message is NPAP compliant, NPAP Processor 60 generates a message identification in the form of a Windows WM_USER message as indicated at step 223. Two parameters are typically associated with the WM_USER message. The first is a mask which identifies the alert as an Operator Panel Change Alert or other predefined alert type. The second parameter is a pointer to a data structure which identifies the particular printer such as 16 which generated the alert. The WM_USER message is retrieved by GUI 53 which, upon recognizing the alert as an Operator Panel Change Alert, retrieves the data to be displayed from NPAP Processor 60 as shown at step 226. According to a step 229, GUI 53 translates the display data from code page 850 or other format as received from printer 16 into ASCII code and parses the data into four separate lines corresponding to the four lines associated with the display field 37' within replica 35'. GUI 53 then repaints display field 37' with the four lines of new alphanumeric display data as indicated at step 233. To do this, GUI 53 employs standard Microsoft Windows Application Program Interfaces (API's). A RECTANGLE API is used to initially clear display field 37'. Thereafter, while the new information is displayed thereon using a TEXTOUT API. Rapid execution of these operations is ensured by an UPDATE WINDOW API. Repainting step 233 is carried out without substantial delay and in such a way that the information displayed on replica 35' is, in substantially real-time, a substantial visual replica of the actual operator panel 35 of printer 16. This permits the user of host 11 to have access to the same information as would be available at the printer 16 if the user were viewing the actual operator panel 35 irrespective of whether that printer 16 or its operator panel 35 is visually or physically accessible to that user. Moreover, by presenting the information in the same format as operator panel 35, the replica 35' of the invention permits a user of host 11 to acquire and use the information rapidly and efficiently without confusion either as to where to look within replica 35' to find desired information or as to the meaning of the information presented. Other aspects of the disclosed system achieve even further advantages by permitting a user of host 11 to use replica 35' to control a selected one of any of the printers 16 to which host 11 may be connected.

Figure 5:
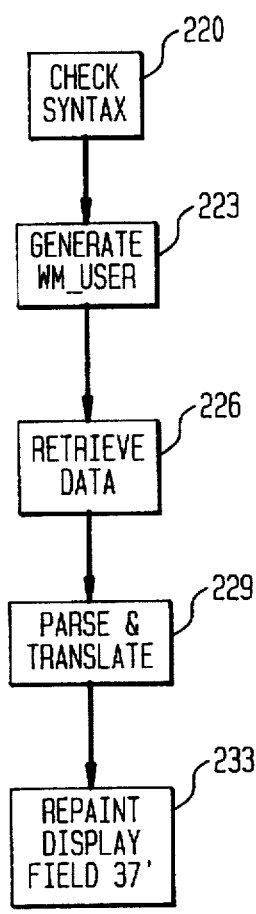
FIG. 5 is a flowchart illustrating the operation of the host computer of FIG. 1 when a button on the operator panel of the printer of FIG. 1 is actuated.
Figure 6:
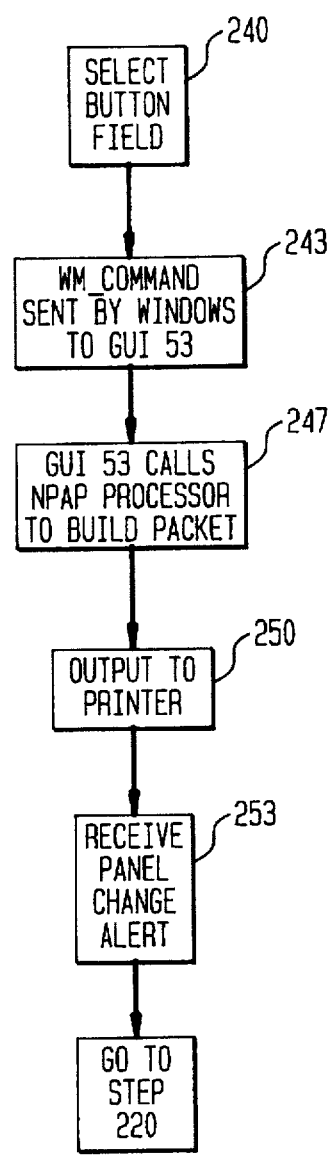
FIG. 6 is a flowchart illustrating the operation of the host computer of FIG. 1 when a button field on the remote operator panel replica displayed on the host is selected.

Referring additionally now to FIG. 6, as indicated at step 240, a user of host 11 may use keyboard 12, mouse 14 or other suitable pointing device to "click on" or otherwise select any of the pushbutton fields 40a', 40b', 40c', 40d', 45' or 46' which form part of the replica 35' appearing on the display 13 of host 11. When one of the aforementioned pushbutton fields is selected, Windows generates a WM_COMMAND message whose parameters indicate which pushbutton field was selected. This message is sent by Windows to GUI 53. GUI 53 responds by calling NPAP Processor 60 to build a PUSH OPERATOR PANEL BUTTON NPAP command extension packet of the form described above as step 247 reflects. As indicated at step 250, this packet, which identifies the particular pushbutton field which has been selected, is transmitted to the identified printer 16. Printer 16 processes the packet as will be explained with reference to FIG. 7 and generates an Operator Panel Change Alert which, upon being received by host 11 from printer 16 is processed by host 11 described above with reference to FIG. 5 beginning at step 220 in order to update the message appearing on the display field 37' of replica 35'.

Figure 7:
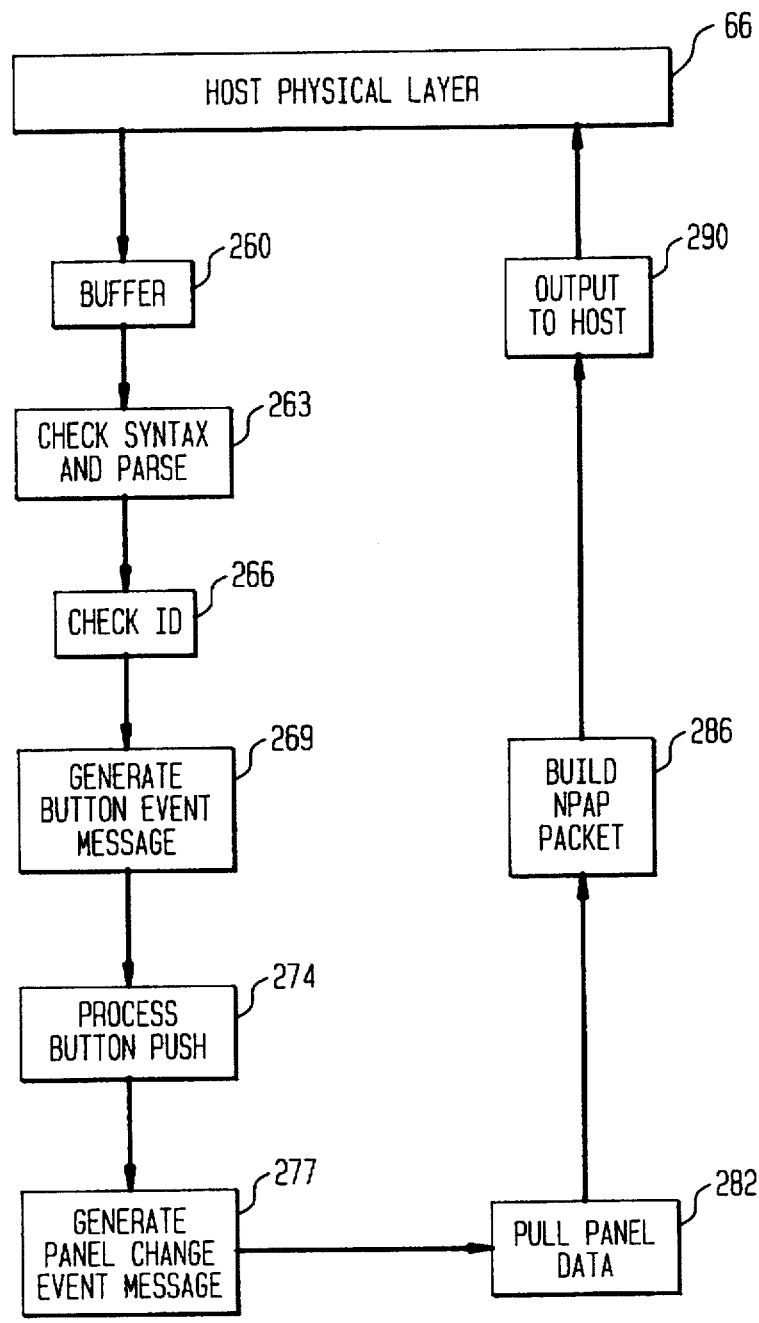
FIG. 7 is a flowchart illustrating the operation of the printer of FIG. 1 when a button field on the remote operator panel replica is selected.

Referring to FIG. 7, the Push Operator Panel Button command extension packet sent by host 11 in response to a user selecting one of the button fields 40a', 40b', 40c', 40d', 45' or 46' of replica 35' is received by printer 16 through an appropriate one of ports 75, 77 or 79 and is held in a buffer associated with either Port BIOS 132 or 133 as indicated at step 260. NPAP Task 131 retrieves the packet from the buffer, checks its syntax and parses the command as indicated at 263. The packet is checked to ensure its length corresponds to the length indicated in the length bytes and the NPAP "wrapper" i.e. the start, length and flag bits are stripped away. As indicated at step 266, NPAP Task 131 checks the host ID included with the command data to insure the host 11 is the same host 11 which had previously sent an Enable Replica Control command extension as described above. If the ID bytes included in the command data do not correspond to those stored by printer 16 in response to a prior Enable Replica Control command extension, the printer 16 rejects the request. If the identification bytes correspond however, NPAP Task 131 generates a button event message according to step 269. The button event message is one which identifies which particular pushbutton field 40a', 40b', 40c', 40d', 45' or 46' has been selected. This message is sent to Printer State Manager 140 which processes the command in the same way that it would if the pushbutton 40a–40d, 45 or 46 corresponding to the button field 40a–40d', 45' or 46' specified in the Push Operator Panel Button command extension had been actuated.

At step 277 Printer State Manager 140 and Menu Manager 120 determine the next message to appear on display 37 and causes same to be displayed thereon in the manner described above. In response to the Operator Panel Change Event Message, NPAP Task 131 accesses the new operator panel message data at step 282. As block 286 indicates, NPAP Task 131 then builds NPAP Operator Panel Change Alert Packets of the form described above and transmits them to host 11 via physical layer 66 as indicated at step 290. Host 11 then processes the packet as described above with reference to FIG. 5 to substantially simultaneously update the message appearing on display field 37'. As those skilled in the art will appreciate, implementation of the system as described offers a number of advantages in addition to avoiding the necessity of polling. Significantly, when one of the pushbutton fields 40a'–40d', 45' or 46' associated with replica 35' is selected by a user of host 11, printer 16 rather than host 11 determines the new message to appear on display field 37'. This reduces communication traffic as well as processing time and memory demands imposed on host 11. Also, because the information displayed on replica 35' is actually received from printer 16 as opposed to being generated by host 11, the user of host 11 is provided with feedback as to the true response of printer 16 to control actions initiated through replica 35'.

Returning to FIG. 8, the button 303 is "depressed"; and the pictured printer is the locally-attached printer 16. The other printers accessible by the host are listed on buttons below the button 303. For example, the button 304 corresponds to the printer 16', and the button 305 corresponds to the printer 16". As indicated earlier, the NPAP Processor 60 (FIG. 2) sends the appropriate NPAP commands to register for device status alerts of interest. Typically, all alerts including operator panel change alerts and configuration changes are provided for the selected printer, while output alerts, operator intervention required alerts, device service required alerts, configuration change alerts and supplies alerts are provided for the non-selected printers.

For the non-selected printers, the NPAP Processor 60 registers for output alerts, operator intervention required alerts, device service required alerts, configuration change alerts and supplies alerts. When an alert is received from a printer for which the NPAP Processor has registered, the alert condition is depicted on the button for that non-selected printer. As illustrated, the printer 16' has signified the presence of an alert condition which is shown pictorially on the button 304 as indicated at 306. In this way, the user is apprised of alert conditions on printers other than that presently selected. For more information about the alert, the user may "select" the printer 16' by "clicking on" the button 304.

Figure 10:
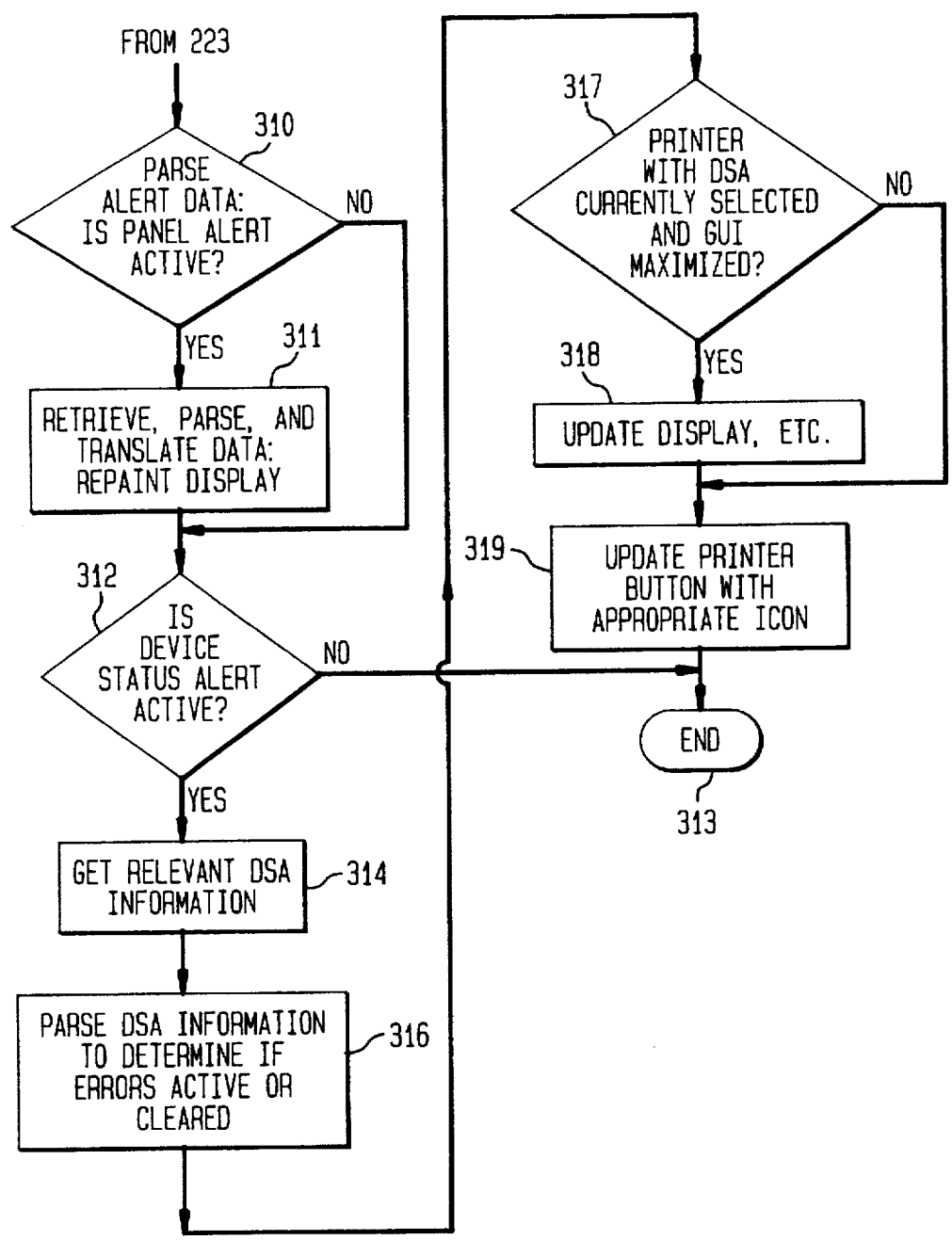
FIG. 10 is a flowchart illustrating the operation of the host computer of FIG. 1 for processing alert messages from printers available to the host.

Referring to FIG. 10, there is an elaboration of the alert processing procedure in the host 11 beyond that in the flowchart of FIG. 5, which discussed the processing of the Operator Panel Change Alert. In FIG. 5 the first two steps were the NPAP Processor checking the syntax of any incoming message to insure it constitutes a valid NPAP communication (Step 220). For NPAP compliant messages, the NPAP Processor 60 generates a message identification in the form of a Windows WM_USER message (Step 223 of FIG. 5). As discussed earlier, the parameters typically associated with this message are (1) a mask which identifies the alert as being of a particularly type, and (2) a pointer to a data structure which identifies the particular printer which generated the alert.

In the more general case of processing various types of alerts illustrated in FIG. 10, after the Step 223 of FIG. 5, the GUI 53 parses the alert data in the WM_USER message and determines (310) if the alert is an operator panel alert and if the panel alert is active for the printer associated with the message. If so, the GUI 53 parses the operator panel data and updates the operator panel display currently on the screen (311). If the alert data is not for an active panel, the GUI 53 determines if (312) the particular alert is active for the printer associated with the alert message. If not, the handling of the alert is complete (313). If the device status alert is active, the GUI 53 obtains the relevant device status alert information for the particular printer from the NPAP Processor 60 (314). The GUI 53 then parses (316) the device status alert information to determine if the alert contains an indication of an active error or a cleared error. This is determined by the NPAP Processor 60 which inspects the appropriate bits in the flag byte of the NPAP alert; and the active or cleared indication is passed from the NPAP Processor 60 to the GUI 53.

The GUI 53 next determines if the printer associated with the alert is the currently selected printer and the GUI Window is maximized (317). If so, the display is updated (318) to properly indicate error status of the printer, such as by changing the pictorial representation of the printer on the display. If there is a detailed status window open on the display, this information is updated, and if there is an appropriate error sound associated with the error, the sound is activated.

If the printers available to the host 11 are indicated on the screen, such as in the button bar format of the main window as shown in FIG. 8, the appropriate printer button is then updated (319) with the appropriate icon information. If the printer has an alert condition which is active, the symbol such as 306 (FIG. 8) is placed on the button for that printer. If an error has been cleared, the indication such as 306 is removed. The handling of the alert is then complete (313).

As can be seen from FIG. 8, if there is an alert associated with a non-selected printer, so that detailed status information is not placed on the screen, the user can in any event be alerted that there is an error condition at a printer accessible to the host. The user can then obtain further information by selecting that printer, elsewhere described herein.

While the foregoing constitutes a preferred embodiment of the invention, according to the best mode presently contemplated by the inventors of making and carrying out the invention, it is to be understood that the invention is not limited to the embodiment which has been described. In light of the present disclosure, various alternative embodiments will be apparent to those skilled in the art. Accordingly, it is to be recognized that changes can be made without departing from the scope of the invention as particularly pointed out and distinctly claimed in the appended claims as interpreted literally or expanded to include all legal equivalents.

What is claimed is:

1. A printing system including a computer having an associated monitor screen and a plurality of printers in bidirectional communication via a communications path with the computer, the computer including a programmed processor which controls an image appearing on the monitor screen, said image including printer status and alert information for a selected printer of the plurality of printers, said processor also being configured to simultaneously control said image so as to display in substantially real time an indication of an error condition occurring at one or more other printers of the plurality of printers, said plurality of printers receiving print data from said computer in print data packets, said computer receiving printer status and alert information from said plurality of printers that are interspersed with said print data packets, said plurality of printers automatically generating, without waiting to be polled, said printer status and alert information, and wherein said indication of said error condition is derived from said alert information.

2. The printing system as recited in claim 1, wherein said programmed processor is further configured to initially register with said plurality of printers for device status alerts.

3. The printing system as recited in claim 1, wherein said programmed processor is further configured to maximize the window on said monitor screen for the selected printer.

4. The printing system as recited in claim 1, wherein said printer alert information is NPAP compliant.

5. A printing system including a computer having an associated monitor screen and a plurality of printers in bidirectional communication via a communications path with the computer, the computer comprising a programmed processor which controls an image appearing on the monitor screen, said image including detailed error information for a selected printer of the plurality of printers, said processor also being configured to simultaneously control said image so as to display in substantially real time a general indication of an error condition occurring at any one or more of the other printers of the plurality of printers, said plurality of printers receiving print data from said computer in print data packets, said computer receiving printer status and alert information from said plurality of printers that are interspersed with said print data packets, said plurality of printers automatically generating, without to be polled, said printer status and alert information, and wherein said indication of said error condition is derived from said alert information.

6. In a printing system including a host computer, a plurality of printers, and a communications path therebetween, the host computer having an associated monitor screen, the improvement comprising:

a first processing circuit at said host computer, a second processing circuit at one of said plurality of printers, said first processing circuit being configured to simultaneously display on said monitor screen printer status and alert information of a selected printer of said plurality of printers and an indication of a general error condition occurring at one or more of the other printers of said plurality of printers and to receive and process a printer alert signal received from said second processing circuit via said communications path:

said second processing circuit being configured to automatically generate, without waiting to be polled, said printer alert signal upon the occurrence of at least one predetermined event occurring at its associated printer, said printer alert signal being transmitted, via said communications path, to said host computer in a data message that is interspersed between data packets containing print data that are transmitted from said host computer to one of said plurality of printers, said first processing circuit being further configured to automatically update the information being displayed on the monitor screen concerning the printer associated with said second processing circuit, thereby updating in substantially real time at said host computer all printer status alerts in connection with the printer associated with said second processing circuit regardless of the status of other data messages of said plurality of printers being transferred through said communications path.

7. The printing system as recited in claim 3, wherein said printer alert signal is generated by said second processing circuit when at least one of the following conditions occurs at the printer associated with said second processing circuit: paper jam, load paper, out of paper, toner low, top cover open, toner cartridge missing, software service error, RAM memory full, complex page, flash memory full, data transmission error, link overrun, printer going ready, printer going not ready, hardware service error, output bin full, and short paper.

8. The printing system as recited in claim 3, wherein said first and second processing circuits and said communications path are configured to transmit and receive said printer alert signal during time periods when said first processing circuit is also sending print job data to the printer associated with said second processing circuit.

9. The printing system as recited in claim 3, wherein said communications path between said host computer and the printer associated with said second processing circuit comprises a local, non-network data link, and said communications path between said host computer and other of said plurality of printers comprises a network.

10. The printing system as recited in claim 3, further comprising: a third processing circuit at another one of said printers, said third processing circuit being configured to automatically generate, without waiting to be polled, a printer alert signal upon the occurrence of at least one pre-determined event occurring at its associated printer, said printer alert signal being transmitted, via said communications path, to said host computer in a data message that is interspersed between data packets containing print data that are transmitted from said host computer to one of said plurality of printers, said first processing circuit being further configured to receive and process said printer alert signal received from said third processing circuit and to automatically update the information being displayed on the monitor screen concerning the printer associated with said third processing circuit, thereby updating in substantially real time at said host computer all printer status alerts in connection with the printer associated with said third processing circuit regardless of the status of other data messages being transferred through said communications path.

11. The printing system as recited in claim 10, wherein said first processing circuit is further configured to initially register with both said second and third processing circuits for device status alerts that may occur at the printers associated with said second and third processing circuits.

12. The printing system as recited in claim 10, wherein said first processing circuit is further configured to maximize the window on said monitor screen in the event that the currently selected printer at said host computer generates a printer alert signal that is communicated over said communications path, and, in the event that one of said plurality of printers other than the currently selected printer at said host computer generates a printer alert signal that is communicated over said communications path, a symbol indicating a device status alert condition is displayed on said monitor screen proximal to a button that corresponds to the printer which generated the printer alert signal.

13. The printing system as recited in claim 10, wherein said printer alert signal is NPAP compliant.

14. The printing system as recited in claim 10, wherein said printer alert signal is generated by said third processing circuit when at least one of the following conditions occurs at the printer associated with said third processing circuit: paper jam, load paper, out of paper, toner low, top cover open, toner cartridge missing, software service error, RAM memory full, complex page, flash memory full, data transmission error, link overrun, printer going ready, printer going not ready, hardware service error, output bin full, and short paper.

15. The printing system as recited in claim 10, wherein said first and third processing circuits and said communications path are configured to transmit and receive said printer alert signal during time periods when said first processing circuit is also sending print job data to the printer associated with said third processing circuit.

* * * * *